(12) United States Patent
Naitou et al.

(10) Patent No.: US 11,509,189 B2
(45) Date of Patent: Nov. 22, 2022

(54) ROTARY ACTUATOR

(71) Applicant: DENSO CORPORATION, Kariya (JP)

(72) Inventors: Ryo Naitou, Kariya (JP); Mikine Kume, Kariya (JP); Hiroyuki Kado, Kariya (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 16/847,854

(22) Filed: Apr. 14, 2020

(65) Prior Publication Data

US 2020/0336037 A1     Oct. 22, 2020

(30) Foreign Application Priority Data

Apr. 16, 2019   (JP) .............................. JP2019-077984

(51) Int. Cl.
*H02K 5/22*       (2006.01)
*H02K 3/50*       (2006.01)
(Continued)

(52) U.S. Cl.
CPC .............. *H02K 5/225* (2013.01); *H02K 3/50* (2013.01); *H02K 3/522* (2013.01); *H02K 5/22* (2013.01);
(Continued)

(58) Field of Classification Search
CPC .......... H02K 5/22; H02K 5/225; H02K 3/522; H02K 11/33; H02K 7/116; H02K 2211/03;
(Continued)

(56) References Cited

U.S. PATENT DOCUMENTS 10,547,136 B2 *   1/2020   Ho ...................... H01R 13/2464
11,152,835 B2 *  10/2021   Kato ...................... H02K 7/116
(Continued)

FOREIGN PATENT DOCUMENTS

JP         04299041 A   * 10/1992
JP         5480217         4/2014

OTHER PUBLICATIONS

Togashi Kozo, Device for Connecting Printed Circuit Board of Armature Coil, Oct. 22, 1992, JP 04299041 (English Machine Translation) (Year: 1992).*

(Continued)

*Primary Examiner* — Alexander A Singh
(74) *Attorney, Agent, or Firm* — Nixon & Vanderhye P.C.

(57) ABSTRACT

A rotary actuator is used in a shift-by-wire system for a vehicle. The actuator includes a motor, a controller, a housing, and a bus bar. The controller controls the motor. The housing holds a stator of the motor and the controller. The bus bar includes a terminal and a holder. The terminal electrically connects a coil of the stator to a control board of the controller. The holder is molded with a part of the terminal. The terminal includes a board-side arm that extends from the holder and a connecting pin that protrudes from the board-side arm toward the control board and that is connected to the control board. The board-side arm includes a stress releasing member that extends along an imaginary plane in parallel with the control board. The stress releasing member includes at least one curved portion at which the stress releasing member is curved or bent.

10 Claims, 8 Drawing Sheets

(51) Int. Cl.
  *H02K 3/52* (2006.01)
  *H02K 11/33* (2016.01)
  *F16H 61/32* (2006.01)
  *H02K 7/116* (2006.01)

(52) U.S. Cl.
  CPC .............. *H02K 11/33* (2016.01); *F16H 61/32* (2013.01); *F16H 2061/326* (2013.01); *H02K 7/116* (2013.01); *H02K 2203/09* (2013.01); *H02K 2211/03* (2013.01)

(58) Field of Classification Search
  CPC ...... H02K 2203/09; H02K 3/50; H02K 11/30; H02K 3/52; H02K 11/00; H02K 11/38; F16H 61/32; F16H 2061/326
  USPC ........................................ 310/71, 68 R, 68 D
  See application file for complete search history.

(56) References Cited

U.S. PATENT DOCUMENTS

2009/0250287 A1* 10/2009 Takashima ........... B62D 5/0406
  180/444
2019/0207462 A1* 7/2019 Uematsu ................ H02K 7/116

OTHER PUBLICATIONS

U.S. Appl. No. 16/847,953, filed Apr. 14, 2020, Rotary Actuator.
U.S. Appl. No. 16/847,974, filed Apr. 14, 2020, Rotary Actuator.
U.S. Appl. No. 16/847,989, filed Apr. 14, 2020, Rotary Actuator.
U.S. Appl. No. 16/847,788, filed Apr. 14, 2020, Rotary Actuator.
U.S. Appl. No. 16/847,801, filed Apr. 14, 2020, Rotary Actuator.
U.S. Appl. No. 16/847,820, filed Apr. 14, 2020, Rotary Actuator and Method of Manufacturing the Same.
U.S. Appl. No. 16/847,854, filed Apr. 14, 2020, Rotary Actuator.
U.S. Appl. No. 16/847,816, filed Apr. 14, 2020, Rotary Actuator.
U.S. Appl. No. 16/847,992, filed Apr. 14, 2020, Rotary Actuator.
U.S. Appl. No. 16/848,024, filed Apr. 14, 2020, Rotary Actuator.
U.S. Appl. No. 16/847,835, filed Apr. 14, 2020, Rotary Actuator.
U.S. Appl. No. 16/847,953, to Kume, et al., entitled: "Rotary Actuator", filed Apr. 14, 2020 (18 pages).
U.S. Appl. No. 16/847,974, to Kannou, et al., entitled: "Rotary Actuator", filed Apr. 14, 2020 (22 pages).
U.S. Appl. No. 16/847,989, to Kume, et al., entitled: "Rotary Actuator", filed Apr. 14, 2020 (20 pages).
U.S. Appl. No. 16/847,788 to Kume, et al., entitled: "Rotary Actuator", filed Apr. 14, 2020 (22 pages).
U.S. Appl. No. 16/847,801, to Kume, et al., entitled: "Rotary Actuator", filed Apr. 14, 2020 (26 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,816, to Imai, et al., entitled: "Rotary Actuator", filed Apr. 14, 2020 (27 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).
U.S. Appl. No. 16/847,835, to Kannou, et al., entitled: "Rotary Actuator", filed Apr. 14, 2020 (18 pages).

* cited by examiner

ROTARY ACTUATOR

CROSS REFERENCE TO RELATED APPLICATIONS

This application is based on Japanese Patent Application No. 2019-077984 filed on Apr. 16, 2019, all of which is incorporated herein by reference.

TECHNICAL FIELD

The present disclosure relates to a rotary actuator.

BACKGROUND

There has been known an electromechanical integrated actuator in which an operating section including a motor and a control section for controlling the motor are integrally formed. For example, the control unit includes a casing, a bus bar module disposed in the casing, and a control board disposed on an upper surface of the bus bar module. The bus bar of the bus bar module is provided with terminal pieces joined to a power component or the like and pin-shaped terminals for signal transmission.

SUMMARY

One aspect of the present disclosure is a rotary actuator used in a shift-by-wire system for a vehicle. The actuator includes a motor, a controller, a housing, and a bus bar. The controller controls the motor. The housing holds a stator of the motor and the controller. The bus bar includes a terminal and a holder. The terminal electrically connects a coil of the stator to a control board of the controller. The holder is molded with a part of the terminal.

The terminal includes a board-side arm that extends from the holder and a connecting pin that protrudes from the board-side arm toward the control board and that is connected to the control board. The board-side arm includes a stress releasing member that extends along an imaginary plane in parallel with the control board. The stress releasing member includes at least one curved portion at which the stress releasing member is curved or bent.

DETAILED DESCRIPTION

Hereinafter, a plurality of embodiments of a rotary actuator (hereinafter, referred to as an "actuator") will be described with reference to the drawings. In the embodiments, substantially the same components are denoted by the same reference numerals and description thereof is omitted.

To begin with, the relative technologies will be described below only for easily understanding the following embodiments. In a bus bar of an actuator, some of the pin-shaped terminals have a stress releasing structure at an intermediate portion between one fixed end of the bus bar close to the holder and another fixed end of the bus bar close to the control board. The stress releasing structure is configured to release a stress between the two fixed ends of the bus bar. The stress releasing structure may include a U-shaped structure in which the structure is bent away from the control board, and then is inverted toward the control board, or a C-shaped structure in which the structure is locally curved in a C-shape.

Such a stress releasing structure cannot be used when a sufficient space in a direction perpendicular to the control board cannot be secured between the holder of the bus bar and the control board. Therefore, the holder of the bus bar and the control board cannot be arranged to be close to each other, and thus the size of the actuator may be increased.

The present disclosure has been provided in view of the above, and the following embodiments provide a rotary actuator that is able to achieve both stress releasing for the bus bar and downsizing of the actuator at the same time.

As described above, one aspect of the present disclosure is a rotary actuator used in a shift-by-wire system for a vehicle. The actuator includes a motor, a controller, a housing, and a bus bar. The controller controls the motor. The housing holds a stator of the motor and the controller. The bus bar includes a terminal and a holder. The terminal electrically connects a coil of the stator to a control board of the controller. The holder is molded with a part of the terminal.

The terminal includes a board-side arm that extends from the holder and a connecting pin that protrudes from the board-side arm toward the control board and that is connected to the control board. The board-side arm includes a stress releasing member that extends along an imaginary plane in parallel with the control board. The stress releasing member includes at least one curved portion at which the stress releasing member is curved or bent.

With the stress releasing member, stress due to temperature deformation or vibration applied to the connecting portion of the terminal with the control board can be reduced, and thus reliability can be improved, even under the situation where a space extending between the holder and the control board in a direction perpendicular to the control board cannot be sufficiently secured. Therefore, it is possible to achieve both downsizing of the actuator and releasing of the stress to the bus bar by arranging the holder of the bus bar at a position close to the control board.

First Embodiment

In this embodiment, an actuator is used as a driver of a shift-by-wire system for a vehicle.

(Shift-by-Wire System)

Figure 1:
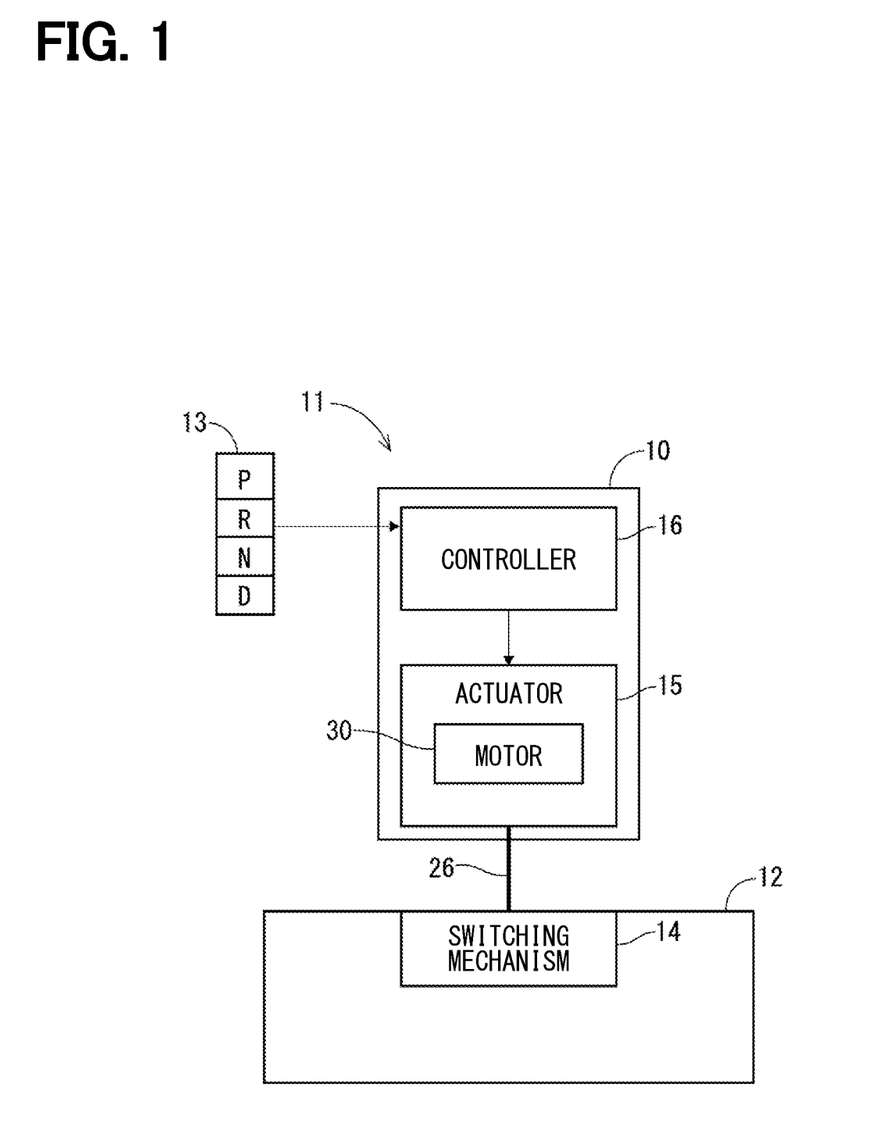
FIG. 1 is a schematic diagram showing a shift-by-wire system to which a rotary actuator according to a first embodiment is applied.

The configuration of the shift-by-wire system will be described with reference to FIGS. 1 and 2. As shown in FIG. 1, the shift-by-wire system 11 includes a shift operating device 13 that outputs an instruction (i.e., a command signal) to designate a shift range to the transmission 12 and an actuator 10 that operates a shift range switching mechanism 14 of the transmission 12. The actuator 10 includes an operating unit 15 that has a motor 30 and a controller 16 that controls the motor 30 in response to a shift range instruction signal.

Figure 2:
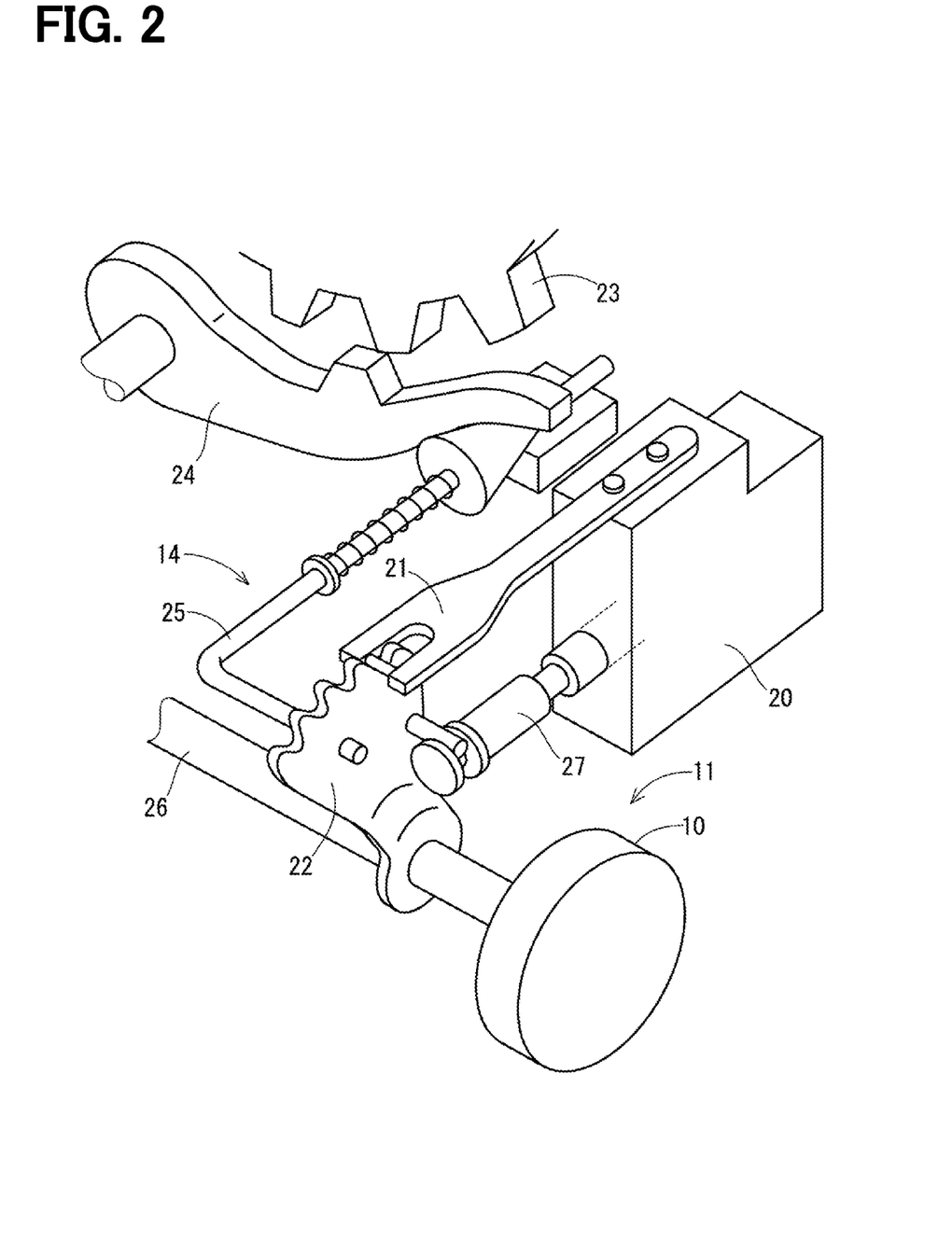
FIG. 2 is a diagram illustrating a shift range switching mechanism of FIG. 1.

As shown in FIG. 2, the shift range switching mechanism 14 includes a range switching valve 20, a detent spring 21 and a detent lever 22, a park pole 24, and a manual shaft 26. The range switching valve 20 controls a supply of hydraulic pressure to a hydraulic operating mechanism in the transmission 12 (see FIG. 1). The detent spring 21 and the detent lever 22 are configured to keep a shift range. The park rod 25 is configured to prevent an output shaft from rotating by fitting the park pole 24 into a park gear 23 of the output shaft of the transmission 12 when the shift range is switched to a parking range. The manual shaft 26 rotates together with the detent lever 22.

The shift range switching mechanism 14 rotates the detent lever 22 together with the manual shaft 26 to move a valve body 27 and the park rod 25 of the range switching valve 20 connected to the detent lever 22 to a position corresponding to a target shift range. In the shift-by-wire system 11, the actuator 10 is connected to the manual shaft 26 in order to perform the shift range change electrically.

(Actuator)

Figure 3:
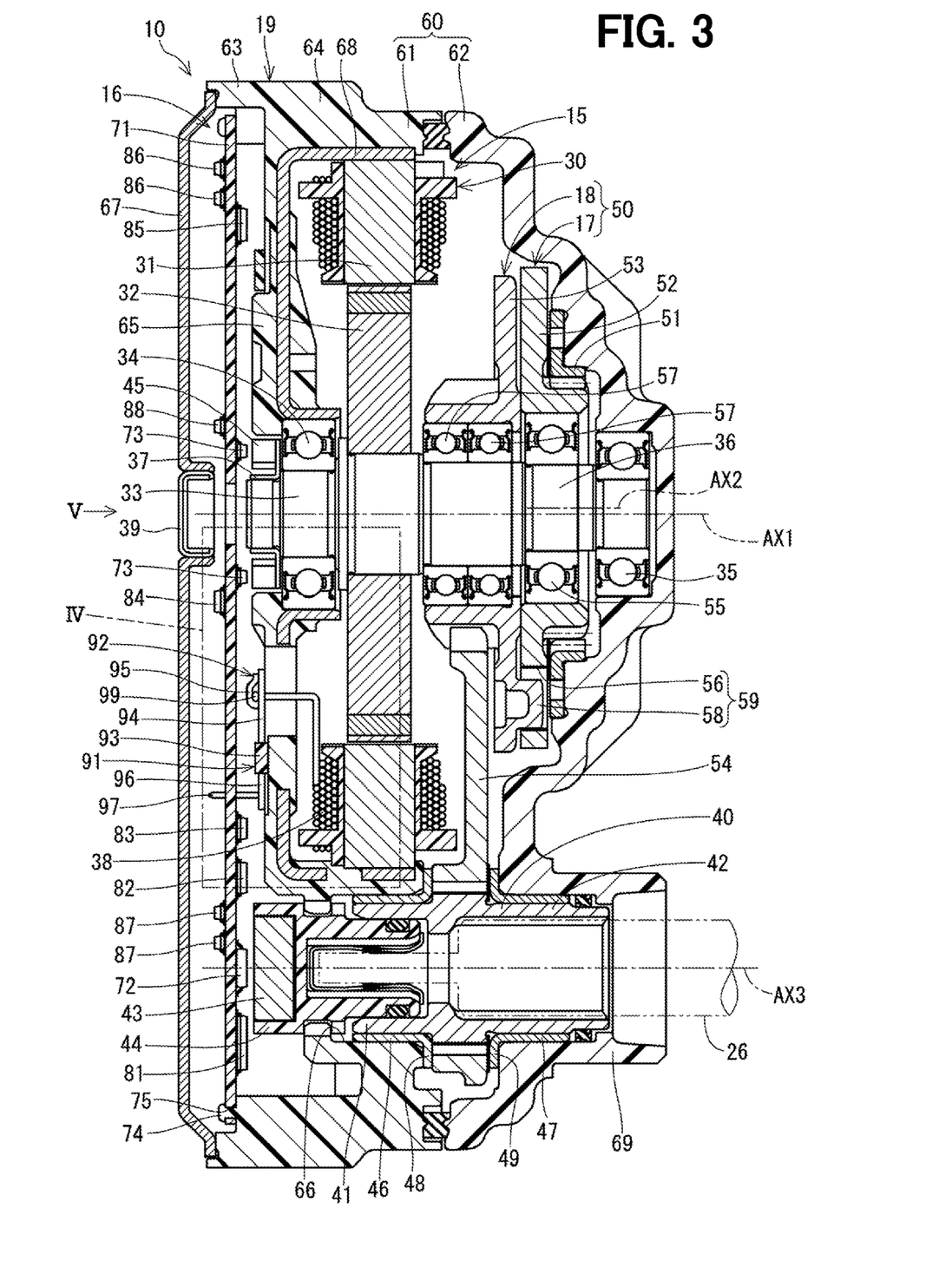
FIG. 3 is a cross-sectional view of the rotary actuator according to the first embodiment.

Next, the configuration of the actuator 10 will be described. As shown in FIG. 3, the actuator 10 is an electromechanical integrated actuator having the operating unit 15 and the controller 16 in a housing 19.

The housing 19 includes a plate cover 67 and a case 60 including a cylindrical upper case 61 and a cup-shaped lower case 62. A partition 65 is formed between one end 63 and the other end 64 of the upper case 61. A control board 71 is provided inside of the one end 63. The control board 71 is covered by a plate cover 67 provided at an opening of the one end 63, thereby ensuring shielding for the control board 71. The lower case portion 62 is attached to the other end portion 64. Further, the lower case portion 62 includes a cylindrical protruding portion 69 that protrudes toward a side opposite to the upper case 61. The manual shaft 26 is inserted into the cylindrical protrusion 69.

The operating unit 15 includes the motor 30 as a driving power generator, an output shaft 40 arranged in parallel with the motor 30, and a speed-reducing mechanism 50 that reduces a rotational speed of the motor 30 and transmits the rotation to the output shaft 40.

The motor 30 includes a stator 31 press-fitted into, and fixed to, a plate case 68 at the other end 64, a rotor 32 provided inside the stator 31, and a motor shaft 33 that rotates about a rotation axis AX1 together with the rotor 32. The motor shaft 33 is rotatably supported by both a bearing 34 disposed in the plate case 68 and a bearing 35 disposed in the lower case portion 62. Further, the motor shaft 33 has an eccentric portion 36 eccentric with the rotation axis AX1 at a position on a side of the rotor 32 close to the lower case portion 62. The motor 30 is able to rotate bidirectionally by controlling a current supplied to coils 38 by the controller 16 and is also able to stop at desired rotational positions. A plug 39 is attached to a through hole of the plate cover 67. If a failure occurs, the motor shaft 33 can be forcibly rotated manually after detaching the plug 39.

The speed-reducing mechanism 50 has a first speed-reducing portion 17 including a ring gear 51 and a sun gear 52 and a second speed-reducing portion 18 including a drive gear 53 and a driven gear 54 as parallel shafts type gears.

The ring gear 51 is coaxially disposed with the rotation axis AX1. The sun gear 52 is rotatably supported about the eccentric axis AX2 by a bearing 55 that is fitted into the eccentric portion 36. The sun gear 52 meshes with, and fits snugly inside, the ring gear 51. When the motor shaft 33 rotates, the sun gear 52 performs planetary motion in which the sun gear 52 revolves around the rotation axis AX1 and rotates about the eccentric axis AX2. At this time, the rotational speed of the sun gear 52 is reduced relative to the rotational speed of the motor shaft 33. The sun gear 52 has a hole 56 for rotation transmission.

The drive gear 53 is provided on the rotation axis AX1 and is rotatably supported about the rotation axis AX1 by a bearing 57 fitted into the motor shaft 33. Further, the drive gear 53 has a protrusion 58 for rotation transmission that is inserted into the hole 56. The rotation of the sun gear 52 is transmitted to the drive gear 53 through engagement between the hole 56 and the protrusion 58. The hole 56 and the protrusion 58 constitute a transmission mechanism 59. The driven gear 54 is provided on the rotation axis AX3 which is parallel to the rotation axis AX1 and coaxial with the cylindrical protrusion 69. The driven gear 54 meshes with the drive gear 53 to circumscribe the drive gear 53. When the drive gear 53 rotates about the rotation axis AX1, the driven gear 54 rotates about the rotation axis AX3. At this time, the rotational speed of the driven gear 54 is reduced relative to the rotational speed of the drive gear 53.

The output shaft 40 has a cylindrical shape, and is provided coaxially with the rotation axis AX3. The partition 65 has a through supporting hole 66 coaxial with the rotation axis AX3. The output shaft 40 is rotatably supported about the rotation axis AX3 by a first flanged bush 46 fitted into the through supporting hole 66 and a second flanged bush 47 fitted inside the cylindrical protrusion 69. The driven gear 54 is a separate component from the output shaft 40, is fitted outwardly to the output shaft 40, and is connected to the output shaft 40 to transmit rotation. The manual shaft 26 is inserted into the output shaft 40, and is coupled to the output shaft 40 through, for example, spline fitting so as to transmit rotation.

One end 41 of the output shaft 40 is rotatably supported by the first flanged bush 46. The other end 42 of the output shaft 40 is rotatably supported by the second flanged bush 47. The driven gear 54 is supported in the axial direction by being clamped between a first flange portion 48 of the first flanged bush 46 and a second flange portion 49 of the second flanged bush 47. In another embodiment, the driven gear 54 may be supported in the axial direction by being clamped between a pair of supporting portions such as the case 60 and another plate.

The controller 16 includes a plurality of electronic components for controlling the motor 30, the control board 71 on which the electronic components are implemented, an output shaft position detection sensor 72 implemented on the control board 71, and a motor position detection sensor 73 implemented on the control board 71. The control board 71 has a plurality of outer circumferential fixing portions 75 fixed to the partition 65 by a heat caulking portion at an outer circumferential surface of the control board 71.

The plurality of electronic components include a microcomputer 81, a MOSFET 82, a capacitor 83, a diode 84, an ASIC 85, an inductor 86, a resistor 87, a capacitor chip 88, and the like.

The output shaft position detection sensor 72 is disposed on the control board 71 at a position facing the magnet 43. The magnet 43 is fixed to a holder 44 attached to the output shaft 40. The output shaft position detection sensor 72 detects a rotational position of the output shaft 40 and the manual shaft 26 rotating together with the output shaft 40 by detecting a magnetic flux generated by the magnet 43.

The motor position detection sensor 73 is disposed on the control board 71 at a position facing the magnet 45. The magnet 45 is fixed to a holder 37 attached to the motor shaft 33. The motor position detection sensor 73 detects a rotational position of the motor shaft 33 and the rotor 32 by detecting a magnetic flux generated by the magnet 45.

(Connecting Structure)

Next, a configuration of a connecting portion between the motor 30 and the controller 16 will be described. Hereinafter, the radial direction of the motor 30 is simply referred to as a "radial direction", the axial direction of the motor 30 is simply referred to as an "axial direction", and the circumferential direction of the motor 30 is simply referred to as a "circumferential direction".

As shown in FIGS. 3 to 6, the actuator 10 includes a bus bar 91. The bus bar 91 includes a plurality of terminals 92 that electrically connect the coils 38 to the control board 71. The bus bar 91 also includes a resin holder 93 that molds a part of each of the terminals 92. The holder 93 is made of resin, and therefore is an insulator.

The holder 93 is a separate member from the housing 19, is formed in an annular shape, and is disposed concentric with the stator 31. The holder 93 is fixed to a portion of the partition 65 of the upper case 61 that faces the control board 71 by, for example, heat swaging.

The terminals 92 are arranged in the circumferential direction of the bus bar 91. Each of the terminals 92 includes a motor-side arm 94, a fusing portion 95, a board-side arm 96, and a connecting pin 97. The motor-side arm 94 extends radially inward from the holder 93. The fusing portion 95 is disposed in an end of the motor-side arm 94 and is connected to a coil end 99 of the coil 38. The board-side arm 96 extends radially outward from the holder 93. The connecting pin 97 protrudes from the board-side arm 96 toward the control board 71 and is connected to the control board 71.

The holder 93 is molded with a connecting portion between the motor-side arm 94 and the board-side arm 96. The fusing portion 95 is compressedly attached to the coil end 99 by fusing. The connecting pin 97 is connected to the control board 71 by, for example, soldering or snap fitting.

Figure 4:
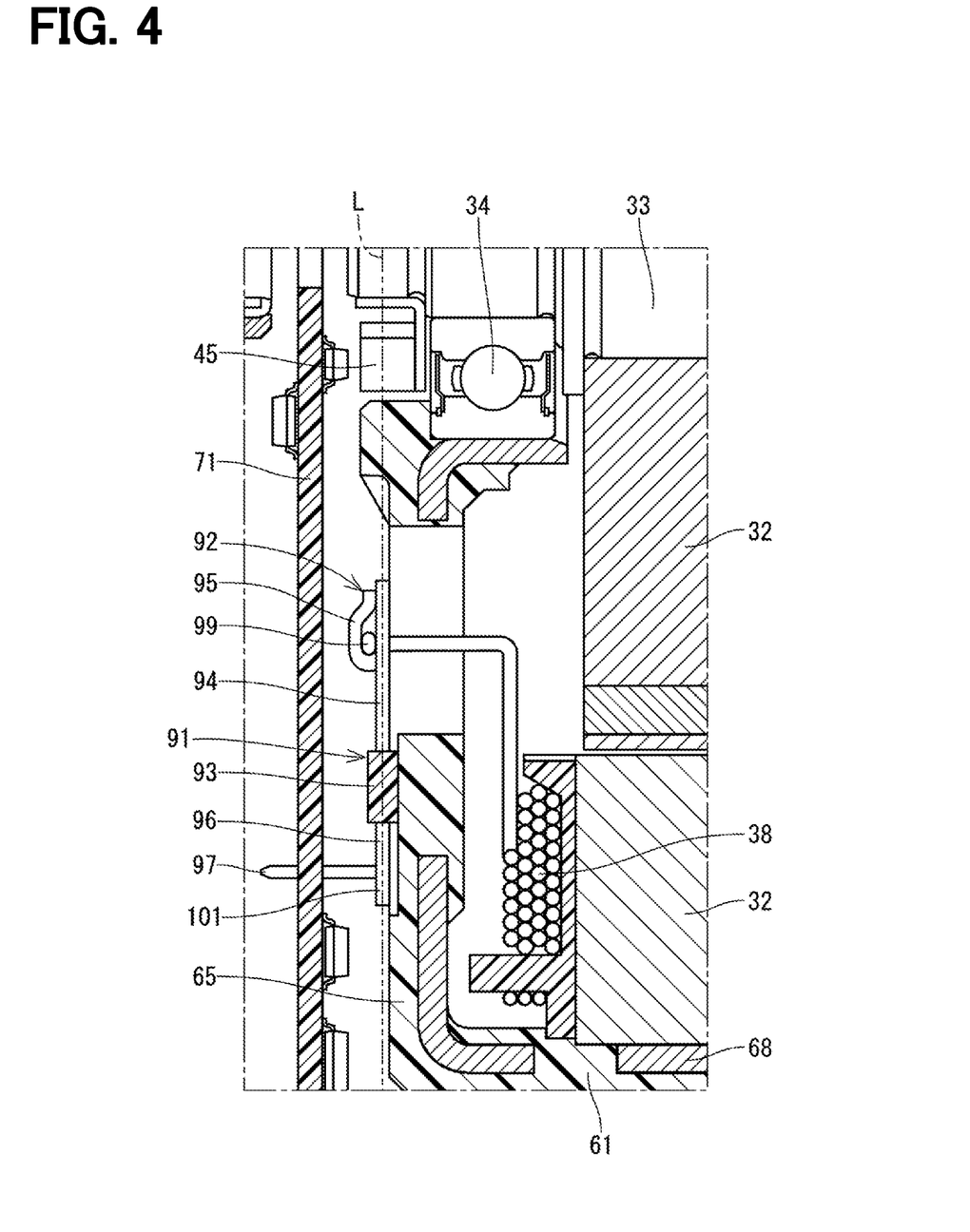
FIG. 4 is an enlarged view of IV part in FIG. 3.
Figure 5:
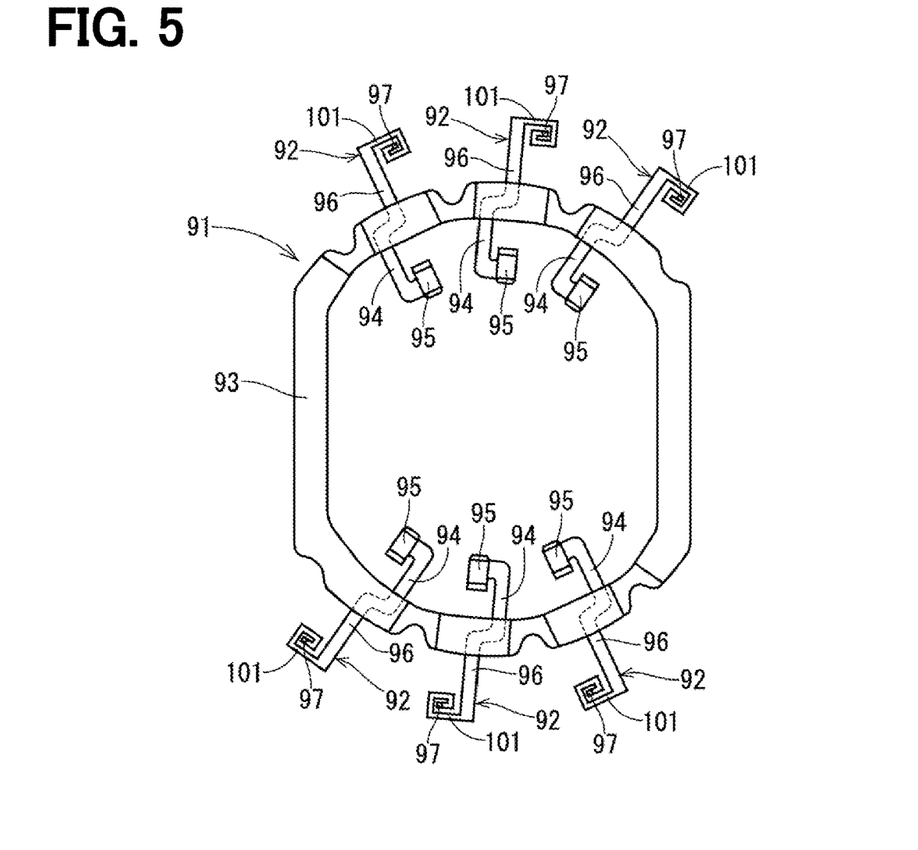
FIG. 5 is a view of the bus bar of FIG. 3 viewed in V direction.
Figure 6:
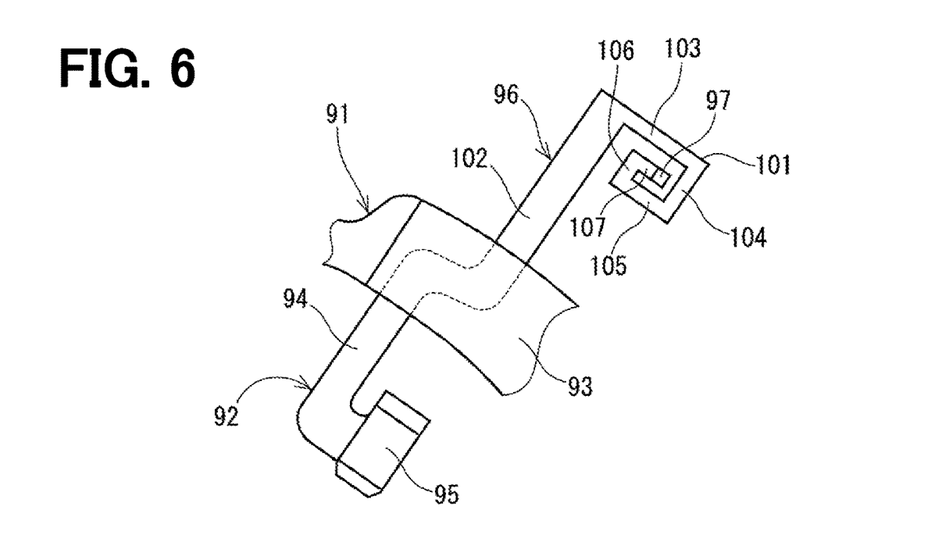
FIG. 6 is an enlarged view of one terminal of FIG. 5.

The board-side arm 96 includes a stress releasing member 101 whose extending direction along an imaginary plane L varies at least one time. As shown in FIG. 4, the imaginary plane L extends in parallel with the control board 71. In other words, the stress releasing member 101 includes at least one curved portion at which the releasing member 101 is curved or bent. FIG. 5 shows the bus bar 91 viewed in a direction perpendicular to the imaginary plane L. In the present embodiment, the stress releasing member 101 is disposed at a tip of a base 102 that extends radially outward from the holder 93. More specifically, the stress releasing member 101 includes a first linear portion 103, a second linear portion 104, a third linear portion 105, a fourth linear portion 106, and a fifth linear portion 107. The first linear portion 103 linearly extends from a distal end of the base 102 in a substantially circumferential direction. The second linear portion 104 linearly extends substantially, radially inward from one end of the first linear portion 103. The third linear portion 105 linearly extends in a substantially circumferential direction from one end of the second linear portion 104. The fourth linear portion 106 linearly extends substantially, radially outward from one end of the third linear portion 105. The fifth linear portion 107 linearly extends from one end of the fourth linear portion 106 in a substantially circumferential direction. The first to fifth linear portions 103 to 107 have extending directions that vary intermittently. That is, the stress releasing member 101 is formed of a plurality of linear portions so that the stress releasing member 101 extends in directions that intermittently varies. The first to fifth portions 103 to 107 form, as a whole, in a spiral shape. The connecting pin 97 is formed to protrude from the center of the spiral shape, that is, one end of the fifth linear portion 107.

Here, a comparative example will be discussed. In the comparative example, the board-side arm is formed of a single arm that extends in a radial direction. In the comparative example, when the control board moves relative to the bus bar about an axis perpendicular to both the axial direction and the extending direction of the board-side arm, stress generated by the motion by the control board would probably be released by the board-side arm deforming in response to the motion of the control board. However, when the control board relatively moves in a direction different from the above-mentioned direction, it would be difficult for the board-side arm to deform in response to the movement, and as a result, the stress cannot be released sufficiently. Furthermore, considering that the extending directions of the board-side arms of the plurality of terminals are different from each other, it would not be possible for all the terminals to release the stress due to temperature deformation or vibration applied to the connecting portions of the terminals with the control board.

On the contrary, the releasing member 101 according to the first embodiment can be deformed in response to the relative motion of the control board 71 in various directions by the cooperation of the linear portions 103 to 107. Therefore, even when the extending directions of the terminals 92 are different from each other, stress due to temperature deformation or vibration applied to the connecting portions of the terminals 92 with the control board 71 can be reduced for all the terminals 92.

As described above, in the first embodiment, each of the terminals 92 includes the board-side arm 96 extending from the holder 93 and the connecting pin 97 protruding from the board-side arm 96 toward the control board 71 connected to the control board 71. The board-side arm 96 includes a stress releasing member 101 whose extending direction varies at least one time along an imaginary plane L that is in parallel with the control board 71. In other words, the stress releasing member 101 includes at least one curved portion at which the releasing member 101 is curved or bent. With the stress releasing member 101, stress due to temperature deformation or vibration applied to the connecting portion of the terminal 92 with the control board 71 can be reduced, and thus reliability can be improved, even under the situation where a space extending between the holder 93 and the control board 71 in a direction perpendicular to the control board 71 cannot be sufficiently secured. Therefore, it is possible to achieve both downsizing of the actuator 10 and releasing of the stress to the bus bar 91 by arranging the holder 93 of the bus bar 91 at a position close to the control board 71.

Further, in the first embodiment, the stress releasing member 101 includes the linear portions 103 to 107 so that the stress releasing member 101 extends in a direction that intermittently varies. With such linear portions 103 to 107, the board-side arm 96 can have the stress releasing member 101 whose extending direction along the imaginary plane L varies at least once. Further, since the stress releasing member 101 is formed of the linear portions 103 to 107, a developed shape of the bus bar 91 can be easily designed, and a low yield ratio of material can be avoided.

In the first embodiment, the holder 93 is fixed to the partition 65 of the upper case 61. By fixing the bus bar 91 to the housing 19 in this manner, it is easy to form a stress releasing structure by resin molding of the housing 19.

Second Embodiment

Figure 7:
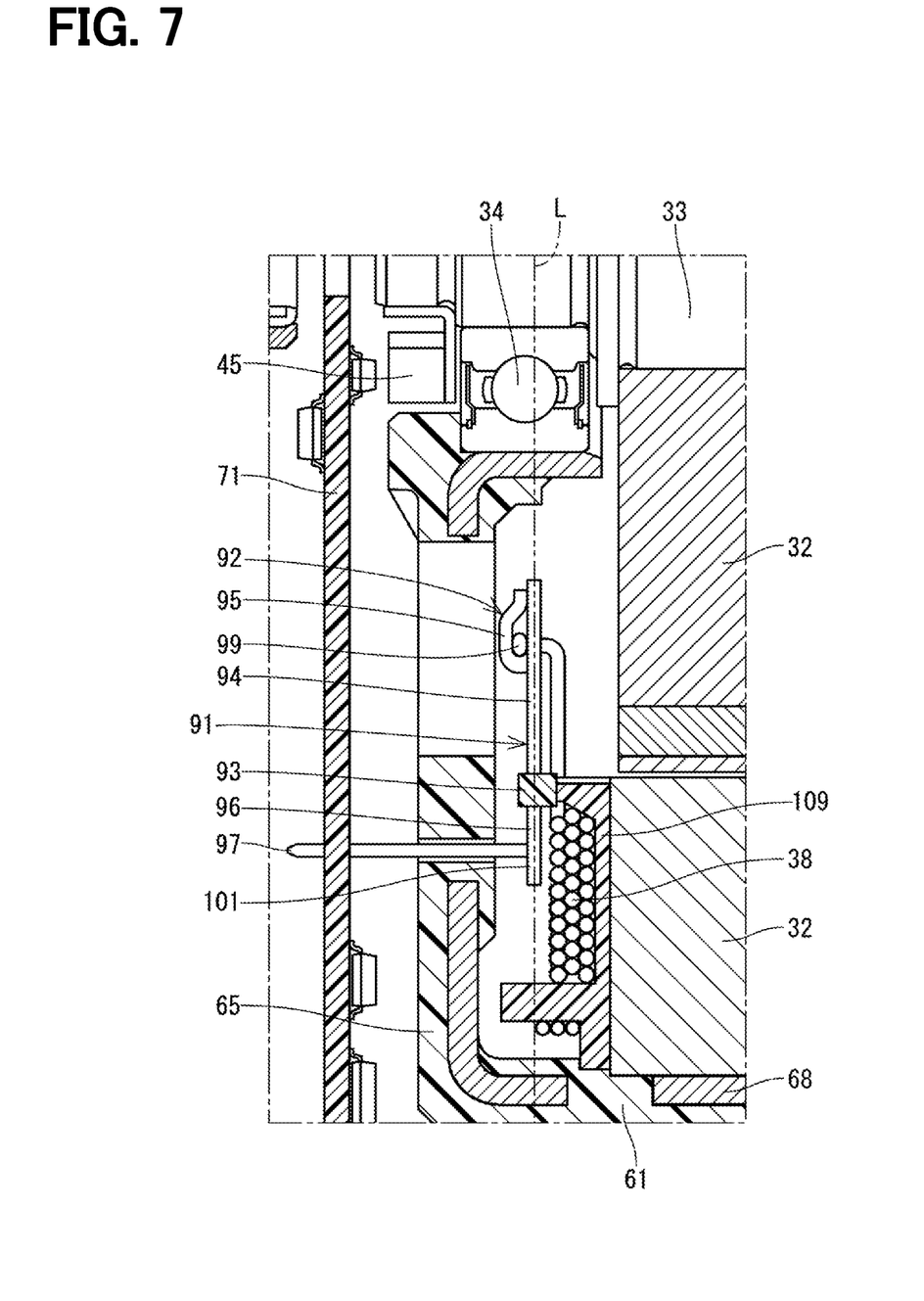
FIG. 7 is a sectional view of a bus bar of a rotary actuator according to a second embodiment, which corresponds to FIG. 4 in the first embodiment.

In the second embodiment, as shown in FIG. 7, the holder 93 is fixed to a bobbin 109 of the stator at a position close to the control board 71 by, for example, heat swaging. Nevertheless, by forming the stress releasing portion 101 whose extension direction along the imaginary plane L varies at least once in the board-side arm 96, the actuator 10 can be downsized and stress to the bus bar 91 can be released as with the first embodiment. Further, by fixing the holder 93 to the stator 31, the actuator can be designed with a smaller size.

Third Embodiment

Figure 8:
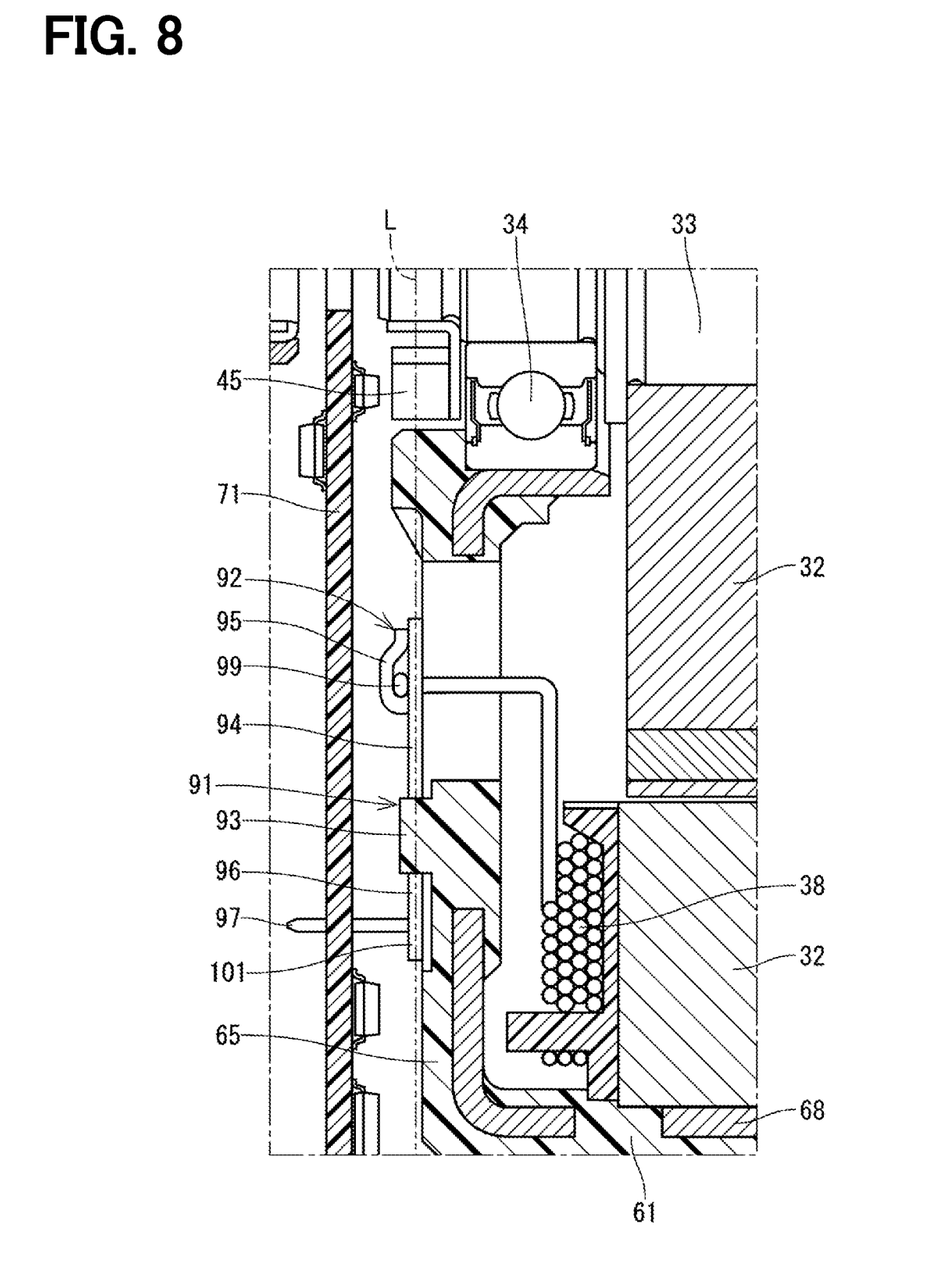
FIG. 8 is a sectional view of a bus bar of a rotary actuator according to a third embodiment, which corresponds to FIG. 4 in the first embodiment.

In the third embodiment, as shown in FIG. 8, the holder 93 is formed on a part of the partition 65 of the upper case 61. In this way, the holder 93 and the housing 19 may be integrally formed with each other using a common material. Nevertheless, by forming the stress releasing portion 101 whose extension direction along the imaginary plane L varies at least once in the board-side arm 96, the actuator 10 can be downsized and stress to the bus bar 91 can be released as with the first embodiment. In addition, since the holder 93 is integrally formed with the housing 19 using the same material, the number of components can be reduced, and the costs for manufacturing can be reduced.

Fourth Embodiment

Figure 9:
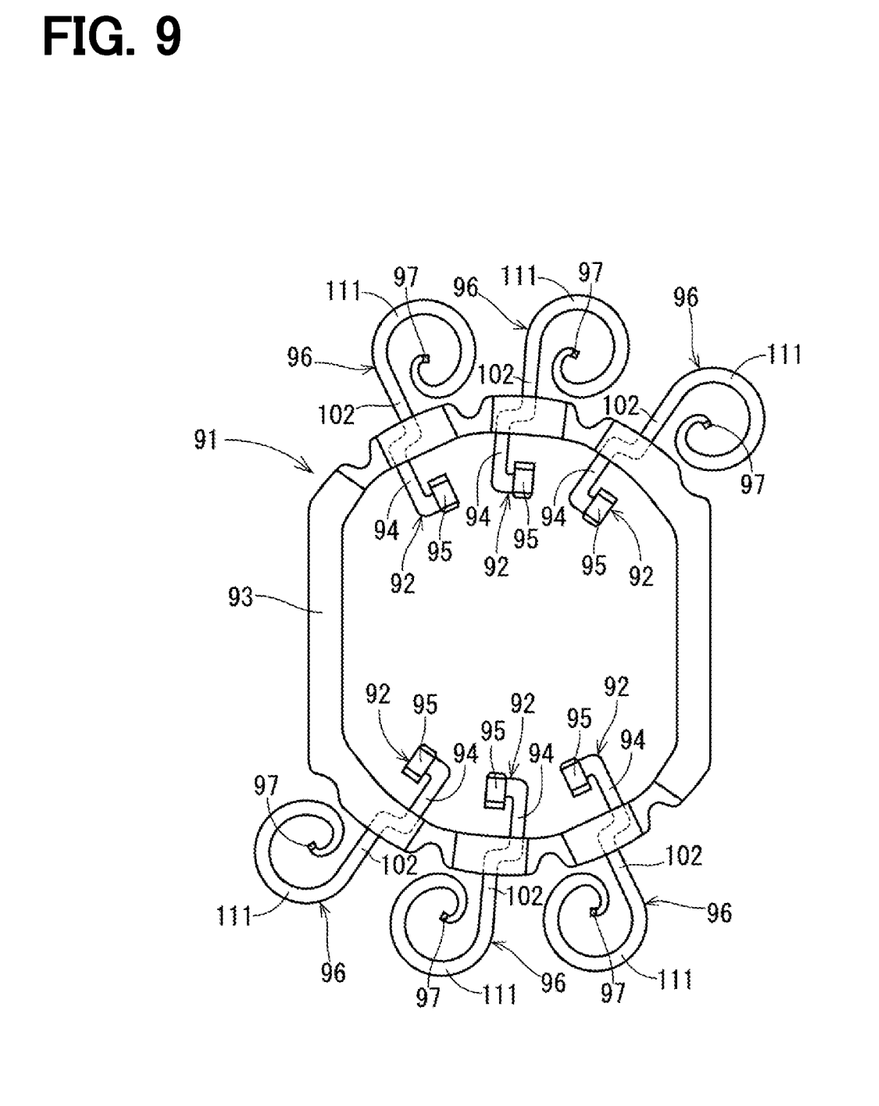
FIG. 9 is a diagram of a bus bar of a rotary actuator according to a fourth embodiment, which corresponds to FIG. 5 in the first embodiment.

In the fourth embodiment, as shown in FIG. 9, the extending direction of the stress releasing member 111 varies at least once along an imaginary plane that is in parallel with the control board. More specifically, the stress releasing member 111 is formed of a curved strip that is gradually, continuously curved to have a spiral shape. That is, the stress releasing member 111 in the fourth embodiment extends to form a spiral shape. Hence, the stress releasing member 111 can be deformed so as to follow the relative motion of the control board 71 in various directions. Therefore, even when the extending directions of the terminals 92 are different from each other, stress due to temperature deformation or vibration applied to the connecting portions of the terminals 92 with the control board 71 can be reduced for all the terminals 92. Therefore, similarly to the first embodiment, both downsizing of the actuator 10 and releasing of the stress to the bus bar 91 can be achieved at the same time. Further, since the stress releasing member 111 is formed of the curved strip, the stress applied to various directions can be more smoothly absorbed by the stress releasing member 111.

Other Embodiments

In another embodiment, the stress releasing member is not limited to the spiral shape, and may have another shape such as an L shape, a C shape, or a wave shape, or a shape in which a straight portion and a curved strip are combined. In short, the stress releasing member may have any shape as long as the stress releasing member has at least one curved portion at which the stress releasing member is curved or bent along a plane that is in parallel with the control board.

In another embodiment, the bus bar is not limited to one holder, and may have a plurality of holders. In yet another embodiment, the bus bar may be fixed not only by heat caulking but also by another fixing measure such as screw fastening, bonding, press-fitting, and press-fitting. In further yet another embodiment, the control substrate is not necessarily limited to be fixed to the case, and may be fixed to a plate cover which is another part of the housing.

The present disclosure is not limited to the embodiments described above, and can be implemented in various forms without departing from the spirit of the invention.

The invention claimed is:

1. A rotary actuator used in a shift-by-wire system for a vehicle, the actuator comprising:
   a motor;
   a controller that controls the motor;
   a housing that holds a stator of the motor and the controller; and
   a bus bar that includes a terminal and a holder, the terminal electrically connecting a coil of the stator to a control board of the controller, the holder being molded with a part of the terminal, wherein
   the terminal includes a board-side arm that extends from the holder and a connecting pin that protrudes from an end of the board-side arm opposite to the holder toward the control board and that is connected to the control board,
   the board-side arm includes a stress releasing member at a position between the holder and the connecting pin, the stress releasing member extending along an imaginary plane in parallel with the control board, and
   the stress releasing member includes at least one curved portion at which the stress releasing member is curved or bent.

2. The rotary actuator according to claim 1, wherein the stress releasing member is formed of a plurality of linear portions such that the stress releasing portion extends in a direction that intermittently varies.

3. The rotary actuator according to claim 1, wherein the stress releasing member is formed of a curved strip that is gradually, continuously curved.

4. The rotary actuator according to claim 1, wherein the holder is fixed to the housing.

5. The rotary actuator according to claim 1, wherein the holder is fixed to the stator.

6. The rotary actuator according to claim 1, wherein the holder and the housing are integrally formed with each other using a common material.

7. The rotary actuator according to claim 1, wherein the stress releasing member is deformable.

8. The rotary actuator according to claim 1, wherein the stress releasing member is deformable in response to a relative motion of the control board.

9. The rotary actuator according to claim 1, wherein the stress releasing member is configured to reduce stress due to deformation or vibration applied to the terminal.

10. The rotary actuator according to claim 1, wherein the stress releasing member is configured to reduce stress due to deformation or vibration applied to the terminal with the control board.

* * * * *